United States Patent [19]
van Buul

[11] 4,387,403
[45] Jun. 7, 1983

[54] TELEVISION CAMERA COMPRISING A CONTROL CIRCUIT FOR CONTROLLING THE INTENSITY OF THE ELECTRON BEAM CURRENT IN AT LEAST ONE PICK-UP TUBE

[75] Inventor: Marinus C. W. van Buul, Breda, Netherlands

[73] Assignee: U.S. Philips Corporation, New York, N.Y.

[21] Appl. No.: 306,064

[22] Filed: Sep. 28, 1981

[30] Foreign Application Priority Data

Oct. 29, 1980 [NL] Netherlands ............... 8005920

[51] Int. Cl.³ ..................................... H04N 5/197
[52] U.S. Cl. ............................. 358/219; 358/74
[58] Field of Search ............ 358/219, 223, 74

[56] References Cited
U.S. PATENT DOCUMENTS

| | | | |
|---|---|---|---|
| 3,600,511 | 8/1971 | Cooksey | 358/219 |
| 4,229,767 | 10/1980 | Ryan | 358/219 |
| 4,322,662 | 3/1982 | Nakamura | 358/219 |

FOREIGN PATENT DOCUMENTS

14019   6/1980   European Pat. Off. ............ 358/219

*Primary Examiner*—Michael A. Masinick
*Attorney, Agent, or Firm*—Thomas A. Briody; William J. Streeter; Edward W. Goodman

[57] ABSTRACT

A television camera comprises a control circuit for controlling the electron beam current intensity in at least one pick-up tube. To prevent oscillations in a positive feedback control loop, a picture signal amplifier in the control loop is provided with a multi-step signal limiter. To this end, for a two-step signal limitation, a diode and a Zener diode have been provided, the junction of which is connected to the base of a biased signal amplifier transistor via a resistor, a second resistor being arranged between the other terminals of the diode and the Zener diode. The junction of the first diode and the second resistor is connected via at least a second diode to the collector of the signal amplifier transistor and the base of an emitter follower transistor connected thereto. The junction of the first Zener diode and the second resistor is connected via a second Zener diode to a voltage terminal.

2 Claims, 2 Drawing Figures

TELEVISION CAMERA COMPRISING A CONTROL CIRCUIT FOR CONTROLLING THE INTENSITY OF THE ELECTRON BEAM CURRENT IN AT LEAST ONE PICK-UP TUBE

BACKGROUND OF THE INVENTION

The invention relates to a television camera comprising a control circuit for controlling the electron beam current intensity in at least one pick-up tube, the control circuit having an input which is connected to a pick-up tube output for producing a picture signal, and an output which is connected to a pick-up tube input for controlling the intensity of the electron beam current, the control circuit including, between the input and the output, a picture signal amplifier comprising a signal amplifier transistor which is biased by means of its base, an emitter-follower transistor and a signal limiter provided between the junction of the collector of the signal amplifier transistor and the base of the emitter follower transistor and a voltage terminal, the signal limiter including a diode and a zener diode which are interconnected.

Such a television camera is disclosed in U.S. patent application No. 191,099 filed Sept. 26, 1980 which is a continuation of 958,318 filed Nov. 6, 1978, now abandoned. In practice the above-described control circuit proved to be very satisfactory for studio and outdoor recording. However, in extreme circumstances, with very great contrasts such as may occur in outdoor recording under a bright blue sky, oscillations may be produced in the positive feedback control loop which are displayed as horizontal lines in the picture. The risk of oscillations is reduced when the quiescent biasing current is increased, but this increase introduces defocussing which reduces the resolution of the picture on display.

SUMMARY OF THE INVENTION

The invention has for its object to modify the above-described control circuit so that in extreme circumstances and with an optimally adjusted quiescent current, no oscillations occur in the positive feedback control loop. A television camera of the invention is characterized in that the junction of the diode and the zener diode is connected to the base of the signal amplifier transistor via a first resistor and that the signal limiter includes a second resistor which is provided between the other terminals of the diode and the zener diode, the junction of the said first diode and the second resistor being connected to the collector of the signal amplifier transistor via at least a second diode and the junction of the said first zener diode and the second resistor being connected to a first voltage terminal via a second zener diode.

The above-described modification of the signal limiter, which operates in two steps, has been found to be sufficient in practice to provide a stable operation of the control circuit even in extreme circumstances with great contrasts.

A further embodiment of a television camera suitable for very great contrasts, which comprises a signal limiter which operates in three steps is characterized in that the control circuit includes a third diode arranged between the second diode and the collector of the signal amplifier transistor, the junction of the second and third diode being connected via a third resistor to the first voltage terminal which is connected to a second voltage terminal via a third zener diode.

DESCRIPTION OF THE DRAWING

The invention will be further described by way of non-limitative example with reference to the accompanying drawing, in which.

DESCRIPTION OF THE PREFERRED EMBODIMENT

Figure 1:
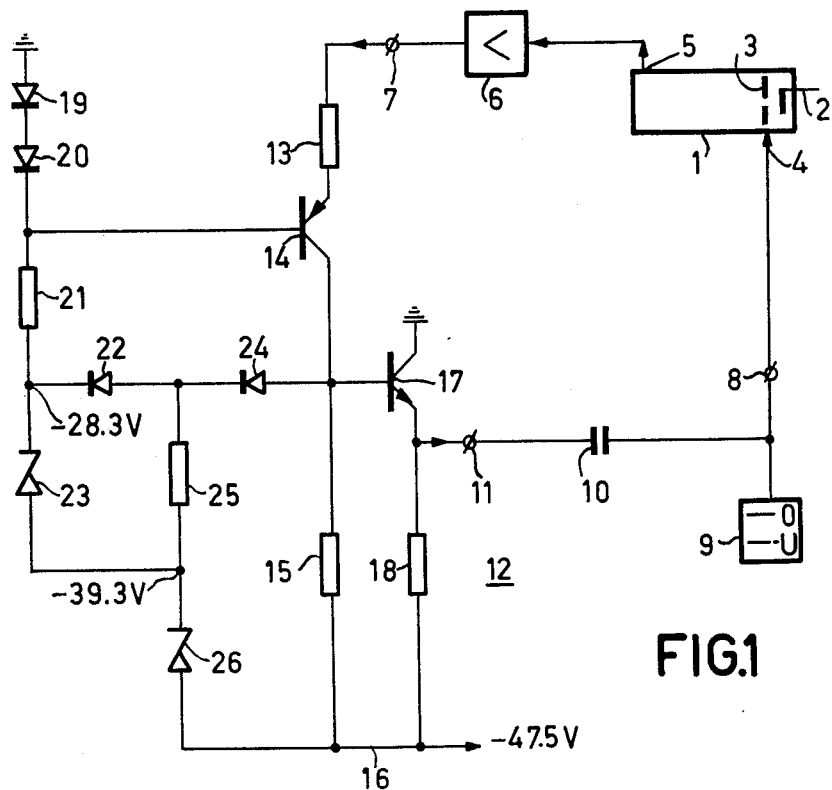
FIG. 1 shows a first embodiment of a television camera of the invention.

Referring to FIG. 1, reference numeral 1 denotes a television pick-up tube. In the pick-up tube 1 only those components which are relevant to the description of the invention are shown. Reference numeral 2 denotes a cathode for producing an electron beam, not shown, the current intensity of which is controllable by means of a control grid 3, which is connected to a control input 4 of the pick-up tube 1. The pick-up tube 1 has an output 5 for producing a picture signal which is generated line and field- sequentially and which corresponds to a televised scene. The pick-up tube output 5 is connected via a signal amplifier circuit 6 to an input 7 of a control circuit, which is still to be further described an output 8 of which being connected to the pick-up tube input 4. The control circuit shown in FIG. 1 comprises a setting stage 9 for producing at the output 8 an adjustable d.c. voltage -U. The voltage -U determines the quiescent biasing current of the electron beam in the pick-up tube 1, this quiescent biasing current having, for example, an optimum value equal to 100 nA, depending on the type of the pick-up tube 1. In addition, the output 8 is connected via a capacitor 10 to an output 11 of a control stage 12, which forms part of the control circuit of FIG. 1. For a detailed description of the pick-up tube 1, the signal amplifier circuit 6 and the setting stage 9 reference is made to the above-mentioned U.S. patent application Ser. No. 191,099, in which three pick-up tubes are provided which are incorporated in a color television camera for which the present invention can also be used. The picture signal occurring at the input 7 is received from the pick-up tube which produces the highest instantaneous picture signal value.

The input 7 of the control circuit of FIG. 1 is connected to the emitter of a pnp-transistor 14 via a resistor 13. The collector of the transistor 14 is connected via a resistor 15 to a voltage line 16 which forms part of a voltage source, not shown, which produces a voltage equal to −47.5 V on the voltage line 16, while the voltage source is further connected to ground. In addition, the collector of the transistor 14 is connected to the base of an npn-transistor 17, whose collector is connected to ground and whose emitter is connected directly to the output 11 and to the voltage line 16 via a resistor 18. In the described implementation, the transistor 14 operates as a signal amplifier transistor and the transistor 17 operates as an emitter-follower transistor.

The base of the transistor 14 is connected to ground via two series-arranged diodes 19 and 20. The junction between the cathode of the diode 20 and the base of the transistor 14 is connected to a connecting point of a resistor 21. The other connecting point of the resistor 21 is connected to the cathode of a diode 22 and to the cathode of a zener diode 23. The anode of the diode 22 is connected to the cathode of a diode 24, which is connected, by means of its anode, to the collector of the transistor 14. In addition, the anode of the diode 22 is connected via a resistor 25 to the anode of the zener diode 23 and to the cathode of a zener diode 26. The anode of the zener diode 26 is connected to the voltage line 16. The zener diodes 26 and 23, which are, for example, of the type BZX 79, produce voltage drops equal to 8.2 V and 11 V, respectively, in response to which the cathodes carry a voltage equal to −39.3 V and −28.3 V, respectively. The base of the signal amplifier transistor 14 is biased via the diodes 19 and 20, the resistor 21 and the zener diodes 23 and 26. For a control circuit which is found to operate satisfactorily in practice and which is of the construction shown in FIG. 1, some values of the components used in the control circuit are:

capacitor 10: 100 nF
resistor 13: 510 Ω
resistors 15 and 18: 10 kΩ
resistor 21: 27 kΩ
resistor 25: 18 kΩ

The control circuit shown in FIG. 1 includes a signal limiter (22–26) which limits the control signal at the output 11 in two steps. For a voltage at the collector of transistor 14 which becomes less negative than −39.3 V plus the voltage drop across the diode 24, the resistor 25 is connected in parallel with the resistor 15, so that the voltage becoming still less negative is limited by the resistance decrease. The collector voltage becoming less negative may continue until the value is reached which is equal to −28.3 V plus the voltage drop across the diodes 22 and 24. The voltage drop across each of the diodes 22 and 24 is, for example, equal to 0.6 V so that the limitation commences at the voltage −38.7 V and the complete extent of limitation is reached at the voltage −27.1 V. This prevents oscillations from occurring in a positive feedback control loop formed by the pick-up tube 1, the amplifier circuit 6, the control stage 12 and the capacitor 10.

Figure 2:
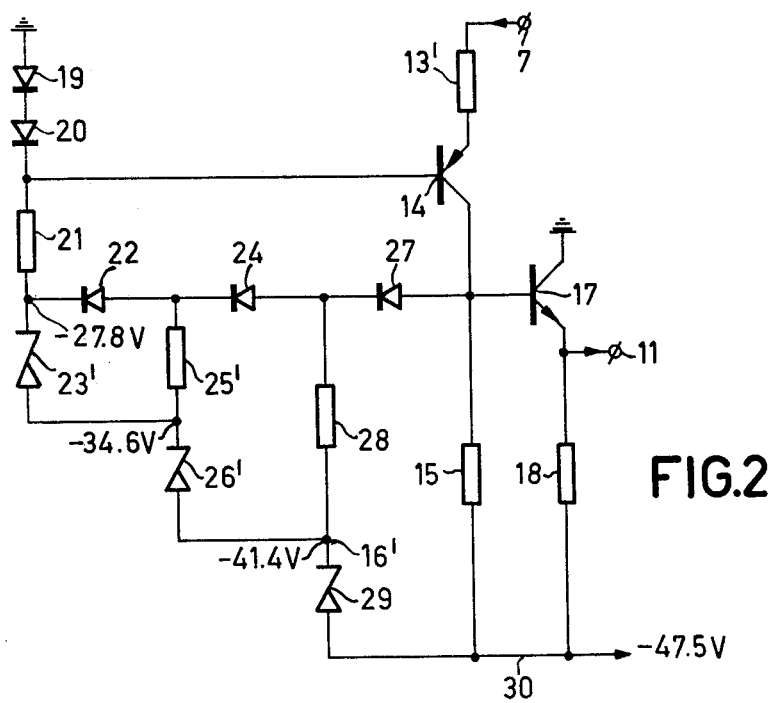
FIG. 2 shows a second embodiment.

FIG. 2 shows an embodiment of the control circuit in which the control signal is limited in three steps. Identical components which were already described with reference to FIG. 1 have been given the same reference numerals. Components which were already described but which have a different value have been given the same reference numerals provided with an accent notation. Compared with FIG. 1, FIG. 2 comprises as additional components: a diode 27, a resistor 28 and a Zener diode 29. The anode of the diode 24 is connected to the collector of the transistor 14 via the diode 27. The junction of the anode of the diode 24 and the cathode of the diode 27 is connected via the resistor 28 to the voltage terminal 16', which is connected to the anode of the Zener diode 26'. The voltage terminal 16' is connected to the cathode of the Zener diode 29 whose anode is connected to a voltage line 30 which forms part of the voltage source, not shown, and which carries the voltage equal to −47.5 V. The voltage line 30 is connected to the resistors 15 and 18. In FIG. 2 the voltages at the cathodes of the Zener diodes 29, 26' and 23' are shown as being −41.4 V, −34.6 V and −27.8 V, respectively, produced by a voltage drop equal to 6.1 V; 6.8 V and 6.8 V across the respective Zener diodes 29, 26' and 23'. The signal limiter (22–29) shown in FIG. 2 has two breakpoints at the voltages equal to −40.8 V and −33.4 V, while full limitation occurs at −26 V, assuming the diodes 22, 24 and 27 each produce a voltage drop equal to 0.6 V.

For a control circuit which operates well in practice and which is of the construction described with reference to FIG. 2 the values of some components are:

Resistor 13'=680 Ω
resistor 25'=5.6 kΩ
resistor 28=10 kΩ

If so desired, further multi-step signal limiters can be realized in a similar manner as the extension from the two-step (FIG. 1, 22–26) to the three-step signal limiter (FIG. 2, 22–29).

What is claimed is:

1. A television camera comprising a control circuit for controlling the electron beam current intensity in at least one pick-up tube, the control circuit having an input which is connected to a pick-up tube output for producing a picture signal, and an output which is connected to a pick-up tube input for controlling the intensity of the electron beam current, the control circuit including, between the input and the output, a picture signal amplifier comprising a signal amplifier transistor which is biased by means of its base, an emitter-follower transistor and a signal limiter provided between the junction of the collector of the amplifier transistor and the base of the emitter-follower transistor and a voltage terminal, the signal limiter including a first diode and a first Zener diode which are interconnected, characterized in that the junction of the first diode and the first Zener diode is connected to the base of the signal amplifier transistor via a first resistor and that the signal limiter includes a second resistor which is provided between the other terminals of the first diode and the first Zener diode, the junction of said first diode and the second resistor being connected to the collector of the signal amplifier transistor via at least a second diode and the junction of said first Zener diode and the second resistor being connected to a first voltage terminal via a second Zener diode.

2. A television camera as claimed in claim 1 characterized in that the control circuit includes a third diode arranged between the second diode and the collector of the signal amplifier transistor, the junction of the second and third diode being connected via a third resistor to the first voltage terminal which is connected to a second voltage terminal via a third Zener diode.

* * * * *